(No Model.) 3 Sheets—Sheet 1.
W. M. BRISBEN.
CABLE RAILWAY.
No. 317,713. Patented May 12, 1885.
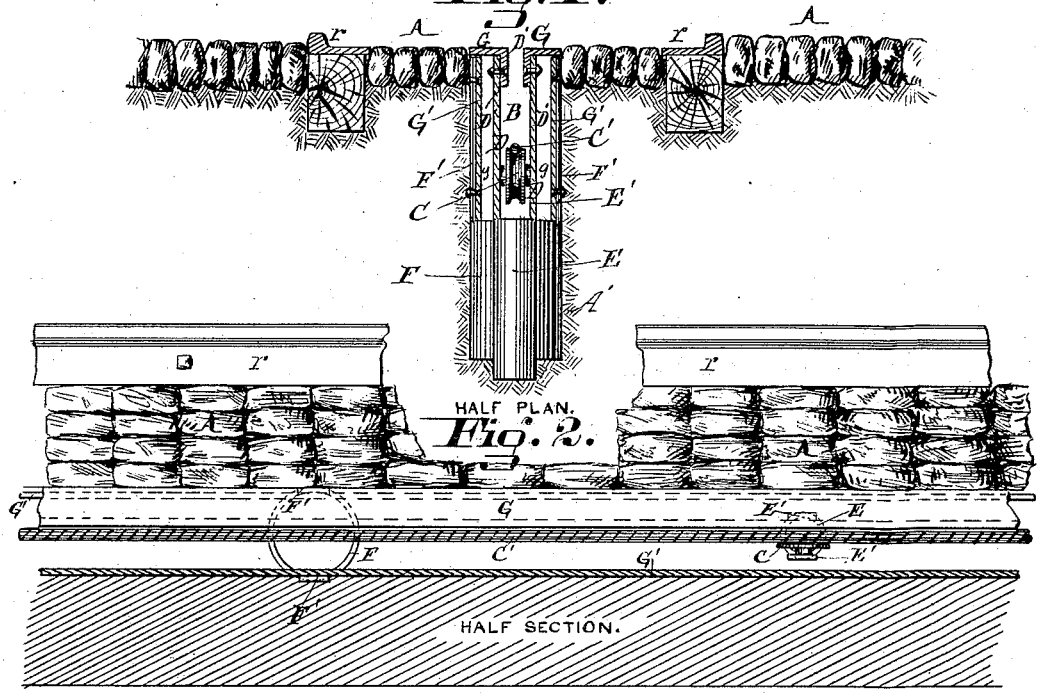
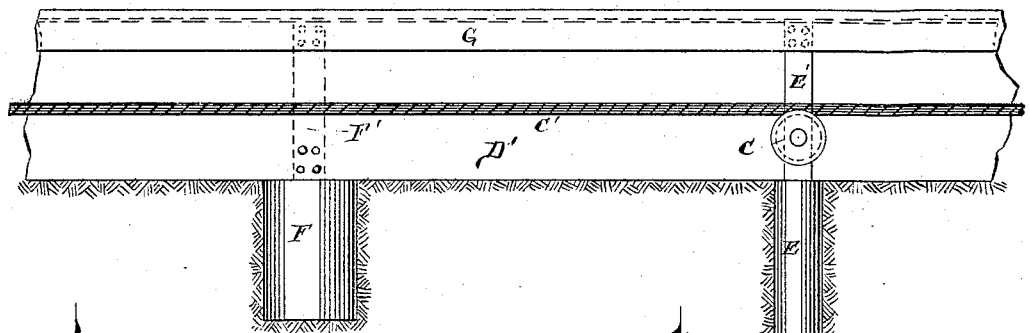

(No Model.) 3 Sheets—Sheet 2.

W. M. BRISBEN.
CABLE RAILWAY.

No. 317,713. Patented May 12, 1885.

Attests.
Will H. Powell
Theo. A. Watterson.

Inventor.
Wm. M. Brisben
By Connolly Bro
Attys (No Model.) 3 Sheets—Sheet 3.
W. M. BRISBEN.
CABLE RAILWAY.
No. 317,713. Patented May 12, 1885.
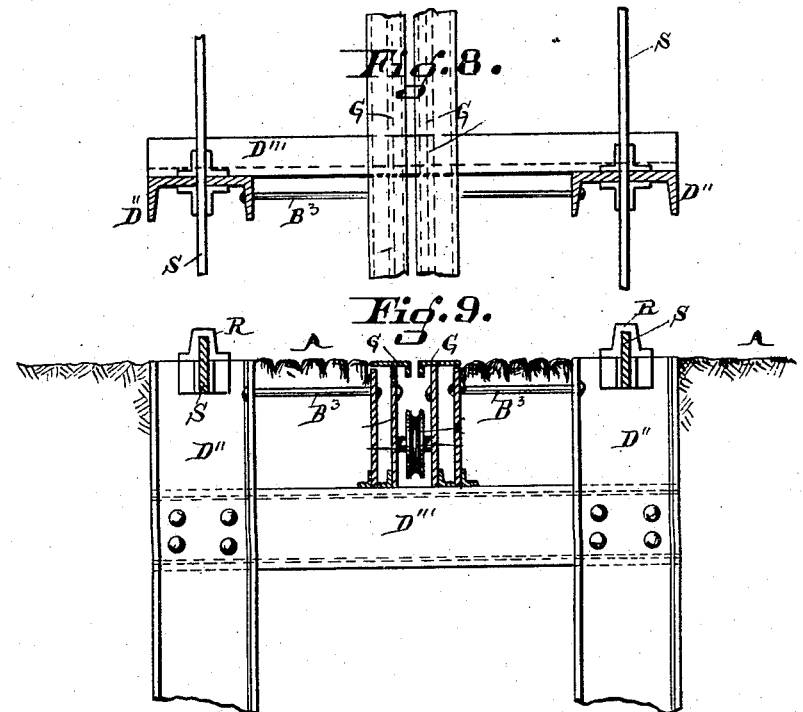
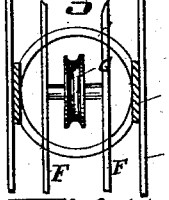
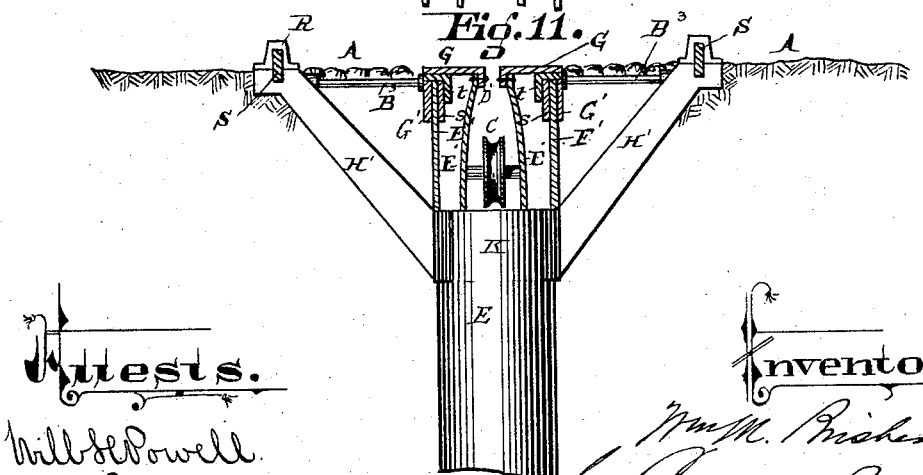
Attests.
Will H Powell.
Theo. A. Watterson.
Inventor.
Wm. M. Brisben
By Connolly Bro
Attys
N. PETERS, Photo-Lithographer, Washington, D. C.

UNITED STATES PATENT OFFICE.

WILLIAM M. BRISBEN, OF PHILADELPHIA, PENNSYLVANIA.

CABLE RAILWAY.

SPECIFICATION forming part of Letters Patent No. 317,713, dated May 12, 1885.

Application filed February 27, 1885. (No model.)

*To all whom it may concern:*

Be it known that I, WILLIAM M. BRISBEN, a citizen of the United States, residing at Philadelphia, in the county of Philadelphia and State of Pennsylvania, have invented certain new and useful Improvements in Cable Railways; and I do hereby declare the following to be a full, clear, and exact description of the invention, reference being had to the accompanying drawings, which form part of this specification, in which—

Figure 4:
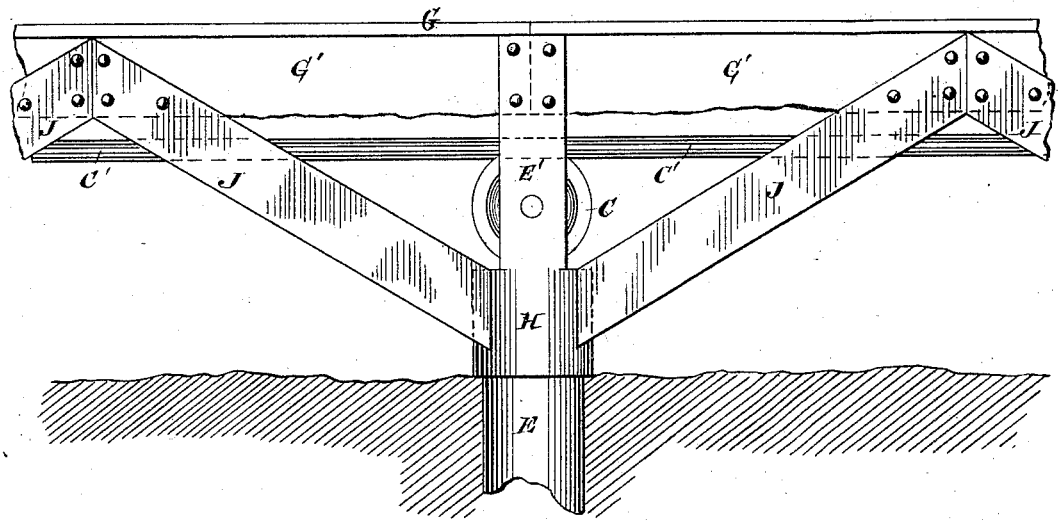
Figure 5:
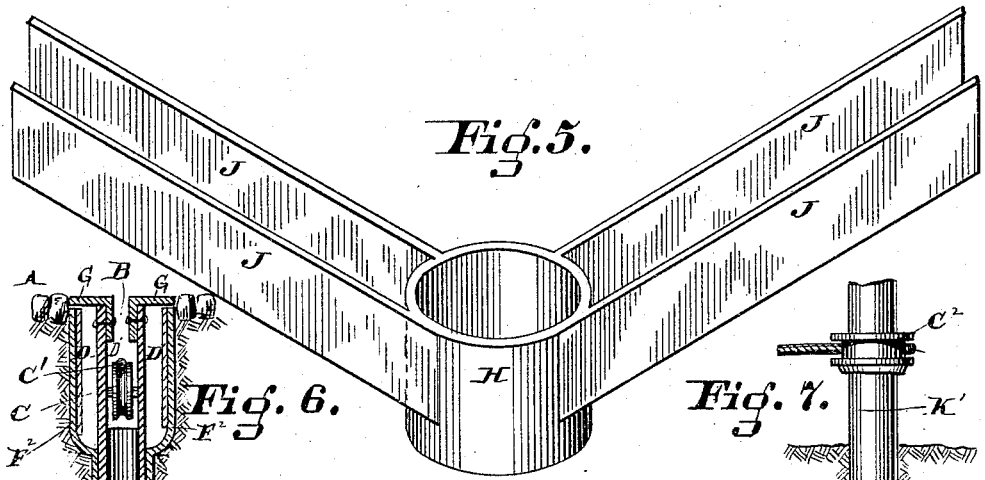
Figure 6:
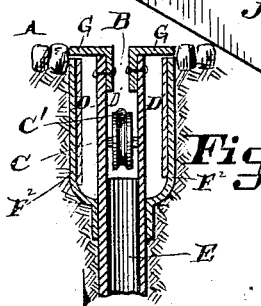
Figure 7:
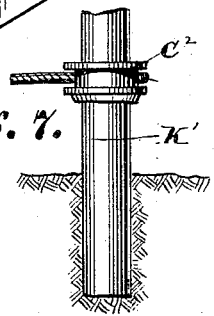

Figure 1 is a vertical transverse section of a cable road-bed and trench with my improvements in place. Fig. 2 is a plan view partly in section. Fig. 3 is a vertical longitudinal section. Fig. 4 is a vertical longitudinal section and partial side elevation, embracing additional features. Fig. 5 is a perspective view of a brace. Fig. 6 is a vertical transverse section of a modification, and Fig. 7 is a side view of a horizontal pulley-support. Figs. 8, 9, 10, and 11 are sectional views of modifications.

This invention has relation to cable railways, and has for its object the provision of certain improvements in construction and arrangement of parts constituting the trough or channel through which the cable runs, such improvements being designed to effect a saving in the cost of material and labor, and to produce a sub-structure for the reception and operation of the cable and its appliances, which shall be capable of safely withstanding the pressure of the earth, and which shall accommodate itself to and compensate for the effects of temperature on the metallic fittings and adapt itself to the many conditions affecting the stability and proper operation of the railway.

Heretofore in the construction of cable railways it has been customary to build the metallic trough of metal plates or castings of single thickness, all connected rigidly together to form a tube for the passage of the cable, said tube being simply laid within the trench with its sides supporting the embankment. With this construction no provision has been made for the differences of expansion and contraction under the influences of the temperature; hence it has been impossible to prevent bending and twisting of the metal and to maintain the way in perfect working-order. Again, by reason of the walls of the trough or channel being of single thickness, the pressure of the earth at the sides has not been adequately resisted, and the trough has injuriously yielded more or less to the pressure of the embankment-walls, which tend to cave inwardly. Finally, as the trough casing has been simply laid within the trench without special expedients to steady it in place, it has had a tendency to become loose and to impair the alignment of its sections, thus causing the gripping devices to bind in the slot of the cable-tube, and a general instability to ensue.

My invention aims at overcoming the defects hitherto incident to cable-railway structures; and it consists in the novel construction, arrangement, and combination of parts, having reference principally to, first, the provision of hollow or tubular metallic pipes adapted to be sunk or driven into the earth at the bottom of the trench, so as to firmly support the parts imposed thereon, and constituting the foundation for sustaining the walls, braces, and other parts of the trough-casing; second, the provision of a trough-casing having double walls, with intervening air-space, by which means the temperature is equalized and differences in expansion and contraction avoided; third, the provision of double walls constituting the sides of the casing, and so constructed and arranged, having independent supports, that movements incident to variations in expansion and contraction can take place without impairing the stability or efficiency of the structure; fourth, the adaptation of the trough structure to the supporting and bracing of the railway-rails.

In the accompanying drawings, r r designate the rails; A, the road-bed, and A' the trench in which is laid the cable, trough, or tunnel. This trough is of the usual form. For the purposes of my invention I sink into the earth at the bottom of the trough the tubular metallic piles E F, constituting the foundation for the trough structure. These tubes are of two different diameters, the larger, F, alternating with the smaller, E, and are situated at equal intervals apart. The tubes E, which occupy the center of the trench, are formed with the side standards, E' E', and to these are bolted the plates D' D', forming the inner walls of the trough or cable-conduit. These standards also support the shafts of the cable-pulleys C. Instead of constructing these piles of hollow iron tubing, they may be solid and made of any material. The larger piles, F, are similarly formed with side standards, F', and to these are bolted or riveted the plates G', constituting the outer or embankment supporting walls of the trough.

G are angle-iron plates, which may be parts of, or integral with, or may be secured to, the plates or stringers D' D', and extend laterally and horizontally, so as to cover the spaces g, between the inner and outer walls and overlap the edges of the plates G', thus inclosing said spaces and protecting the plates. By reason of the double walls greater strength and security are attained, the middle portions of the structure being separated from the earth and protected from the pressure of the same. At the same time the intervening air-space promotes an equalization of temperature between the two walls, and compensates for the tendency toward unequal expansion and contraction. As the angle-iron flanges G rest on the tops of the plates, G' they serve as means of bracing or sustaining the plates D'; but as said flanges are only secured to the inner plates, any movement that may tend to take place under strain or from other causes is limited to that portion of the structure directly subject to the movement—that is, the outer wall and its supports; hence there is no liability of the inner parts of the structure, constituting the conduit proper, becoming bent or displaced should any strain or pressure be imposed on the outer wall.

If desired, the plates G' may be braced by means of the oblique braces J J, composed of the collars H, which are bolted to the tubes, and the oblique beams or plates J', which are formed integral with or attached to said collars and bolted or riveted to the plates, as shown in Fig. 4.

The tubes E F, in addition to their function already described, may serve as supports for the rails, for which purpose I employ the beams H', cast with or secured to collars K, which are bolted or riveted to the tubes E. These beams reach out laterally and upwardly, and upon their ends are rested and secured the rail base bars or beams, as shown in Fig. 11.

In Fig. 6 of the drawings I have shown a modification of my invention wherein I contemplate using only the smaller tubes, to which I attach the standards F², curved outwardly from their lower parts and then upwardly. To these standards I secure the outer plates of the trough, the other parts of the structure being as already described.

In Fig. 7 I show an expedient for the support of horizontal pulleys at corners or bends of the trough. It consists of a tube, K', driven into the ground in the same way as are the tubes E F, and having the pulley C² arranged at a suitable height, with the upper part of the tube as its bearing.

Figs. 8, 9, 10, and 11 represent modifications of my invention. In Figs. 8 and 9 I have shown a construction wherein, instead of using tubular piles, I employ wrought-iron beams D'', and instead of locating these in the trench of the cable-way, I sink them in the ground on either side and directly under the rails, the stringers S, upon which the latter are arranged, being supported on top of the beams. I connect these beams by a transverse tie, D''', bolted to the former, and upon the latter I support the walls and other parts of the cable-conduit, bracing the same to the uprights by horizontal rods B³. This forms a very strong and reliable structure, and is adapted for use in many situations to greater advantage than the structure hereinbefore described.

What I claim as my invention is as follows:

1. In a cable-railway structure or conduit, the combination, with the incased cable-trough, of hollow tubular piles constructed and adapted to support the trough casing or tube, substantially as described.

2. In cable-railway structures or conduits, the combination, with the incased cable-trough, of supporting-piles constructed and adapted to be sunk or embedded in the bottom of the cable-trench, substantially as described.

3. In combination with the incased trough or cable-conduit of a cable railway, the pulley-supporting piles having vertical standards in which the pulleys are journaled, substantially as described.

4. In a cable-railway structure or conduit, the combination, with the double-walled trough-casing, of supporting-piles having uprights or standards for the attachment of the casing-plates, substantially as described.

5. A cable trough or conduit having double walls on either side, with intervening air-spaces, substantially as and for the purpose described.

6. In a cable-railway trough or conduit, the combination, with the inner and outer plates, constituting double walls on either side of the cable-channel, of angle-iron plates or flanges secured to the inner walls and projecting laterally therefrom, so as to cover the intervening air-spaces and the edges of the outer walls, as and for the purpose described.

7. An incased cable trough or casing having double walls on either side separate from and independent of each other to prevent injurious effects from unequal expansion and contraction or other movement of the structural parts, as set forth.

8. The combination, with the rails of a cable railway and the trough or conduit supporting piles, of arms or beams secured to the latter and sustaining the rails on either side, as set forth.

9. In a cable railway, the combination, with the trough or cable-casing and the railway-rails, of supporting-piles sustaining both the casing and the rails, as set forth.

In testimony that I claim the foregoing I have hereunto set my hand this 19th day of February, 1885.

WILLIAM M. BRISBEN.

Witnesses:
 THOS. A. CONNOLLY,
 ANDREW ZANE, JR.